R. EISERMANN & J. LEHNE.
ROTARY EXPANSION ENGINE.
APPLICATION FILED JAN. 26, 1911.
1,089,752.
Patented Mar. 10, 1914.
3 SHEETS—SHEET 1.
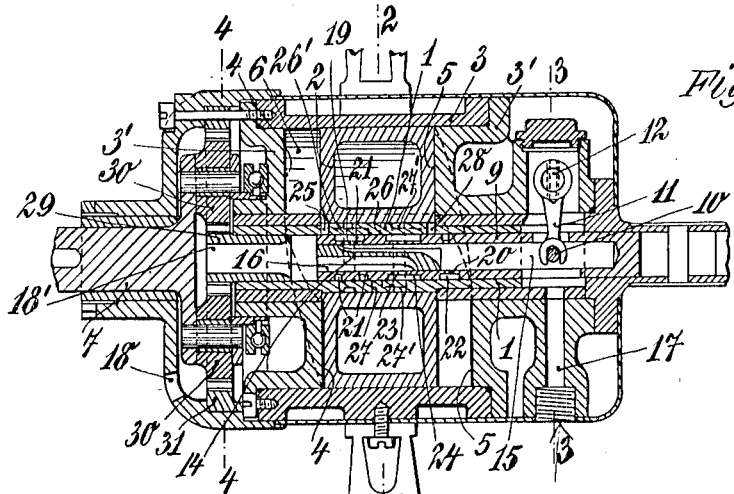
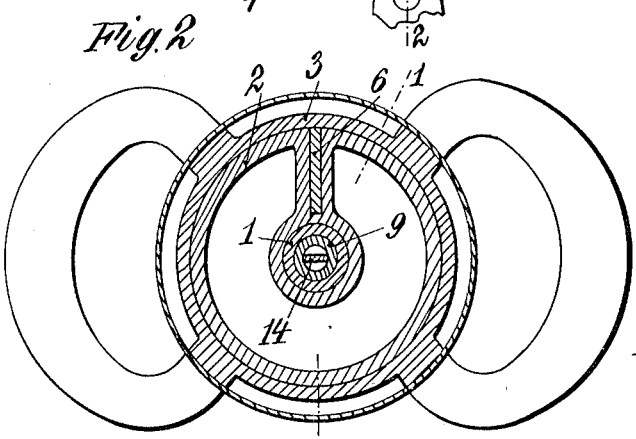
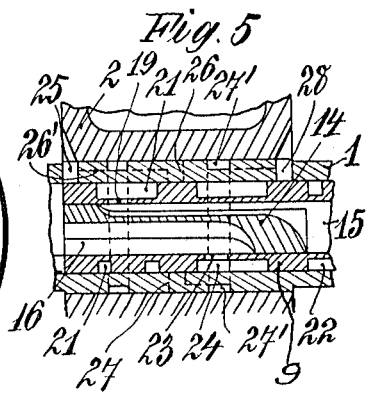
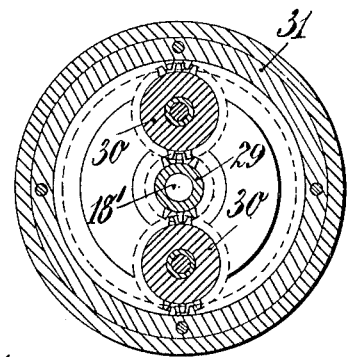
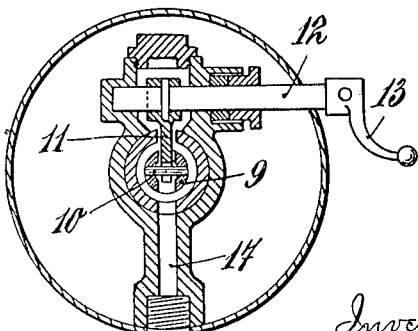
Witnesses
B. Sommers
M. W. Darg
Inventors:
Rudolf Eisermann.
Josef Lehne.
By Henry Orth
Atty

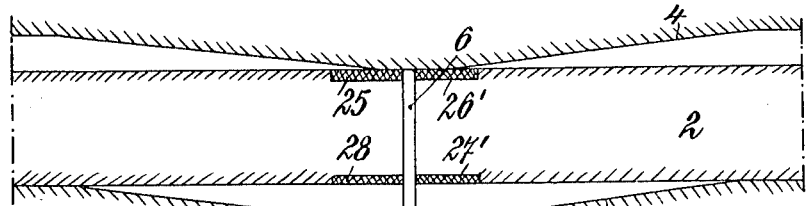
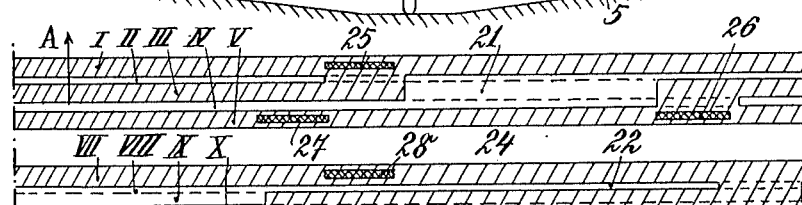
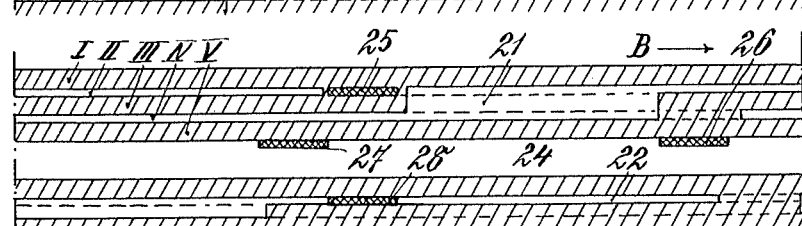
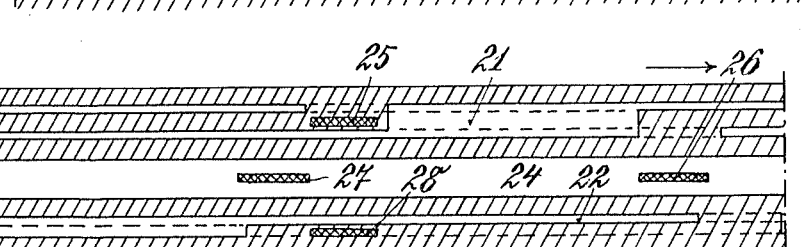
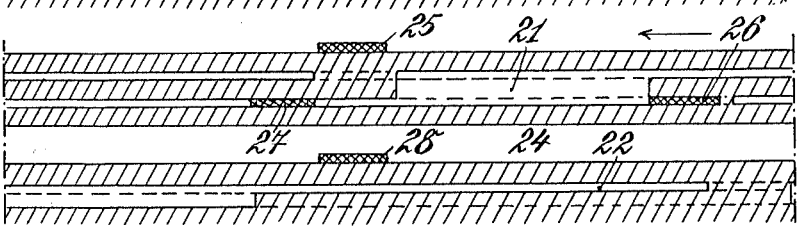
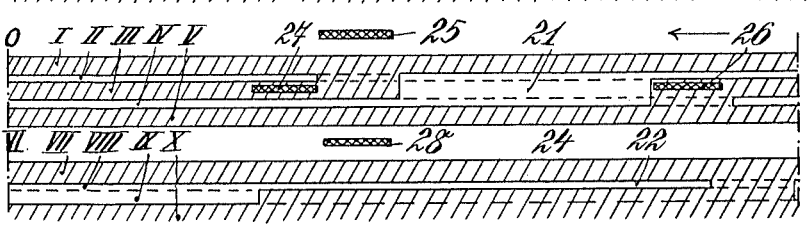

R. EISERMANN & J. LEHNE.
ROTARY EXPANSION ENGINE.
APPLICATION FILED JAN. 26, 1911.
1,089,752.
Patented Mar. 10, 1914.
3 SHEETS—SHEET 3.
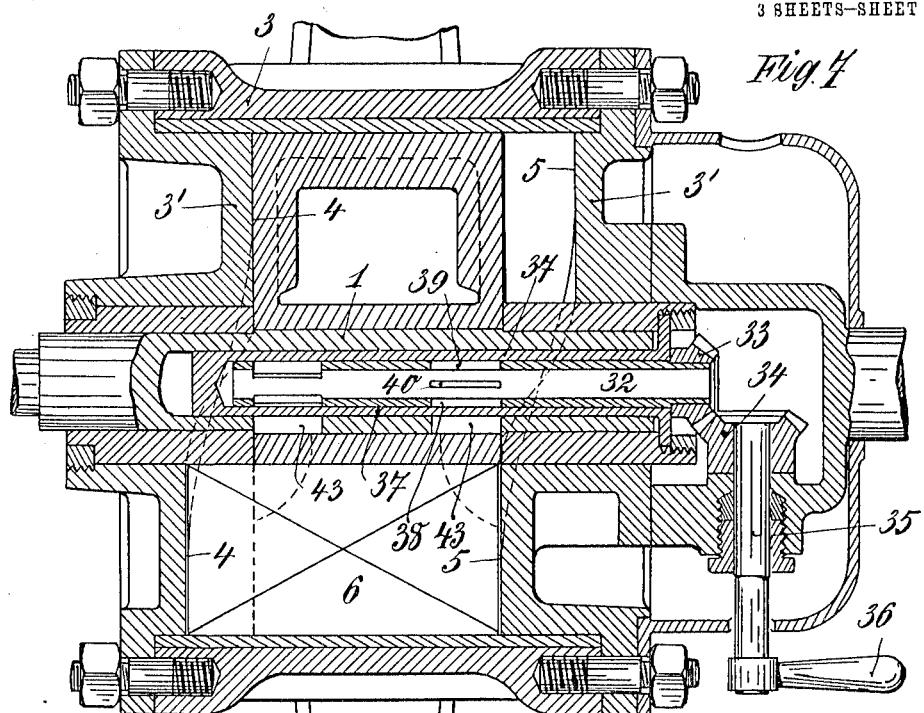
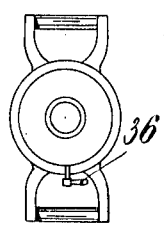
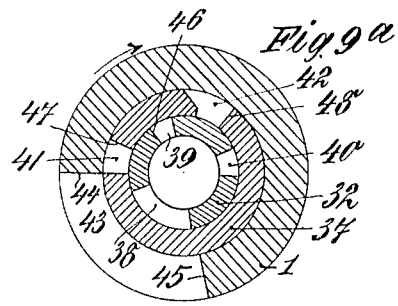
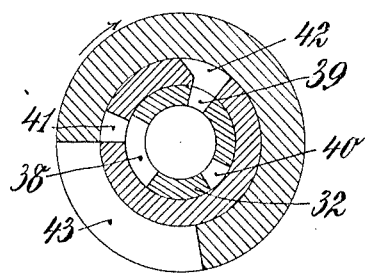
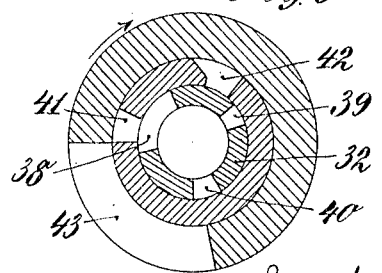
Witnesses:
B. Sommers
M. H. Darg
Inventors:
Rudolf Eisermann,
Josef Lehne.
By Henry Orth Jr.
Atty

UNITED STATES PATENT OFFICE.

RUDOLF EISERMANN, OF BERLIN, AND JOSEF LEHNE, OF CHARLOTTENBURG, GERMANY, ASSIGNORS TO THE AMERICAN ROTARY MACHINE COMPANY, OF NEW YORK, N. Y.

ROTARY EXPANSION-ENGINE.

1,089,752.  Specification of Letters Patent.  Patented Mar. 10, 1914.

Application filed January 26, 1911. Serial No. 604,880.

*To all whom it may concern:*

Be it known that we, RUDOLF EISERMANN and JOSEF LEHNE, subjects of King of Prussia and the Grand Duke of Hesse, respectively, residing at Berlin and Charlottenburg, respectively, Prussia, Germany, have invented certain new and useful Improvements in Rotary Expansion-Engines, of which the following is a specification.

The present invention relates to a rotary engine working with expansion.

According to the invention the controlling device of the engine, serving at the same time as starting valve, is so arranged, that the engine will, on being started, run under full charge so that it will start at any position of the piston, and only then the expansion cut off will be adjusted. This controlling mechanism, which may at the same time be arranged for reversing the engine is preferably made in form of a sleeve valve arranged in the hollow spindle of the piston drum and adjustable by being either displaced axially or turned around its axis so that a very simple construction is obtained.

In the accompanying drawing two constructional forms of the invention are shown in use with pneumatic rock drills.

Figure 1 is a longitudinal section through the one constructional form of the engine along line 1—1 in Fig. 2. Fig. 2 is a transverse section along the line 2—2 in Fig. 1. Fig. 3 is a section along the line 3—3 in Fig. 1 and Fig. 4 is a section along the line 4—4 in Fig. 1. Fig. 5 is a part of Fig. 1 on an enlarged scale. Fig. 6 shows a section along the circumferential surface of the piston drum, spread out in the plane of the drawing. Fig. 6ª shows the correspondingly developed controlling surfaces, which for sake of greater clearness have been projected on a cylinder of the same diameter as the piston drum. Figs. 6ᵇ, 6ᶜ, 6ᵈ, 6ᵉ show the same developed surfaces as Fig. 6ª at other positions of the controlling sleeve. Fig. 7 is a longitudinal section through another constructional form of the engine. Fig. 8 is an end view thereof on a smaller scale. Figs. 9ª, 9ᵇ and 9ᶜ show the controlling mechanism of the engine according to Figs. 7 and 8 on an enlarged scale in the positions for at rest, full charge and expansion cut off.

According to Figs. 1–6 the engine has a drum 2 fitted on a hollow shaft 1 within a casing 3. In a radial slot in this drum a slide 6 is axially movable guided between parallel cam surfaces 4, 5 of the heads 3' of the casing. Working chambers are formed between the end surfaces of the drum 2 and the cam surfaces 4, 5. In the hollow shaft 1, the rotation of which is transmitted in known manner by means of a sun and planet gear 29, 30, 31 to the drill spindle 7, is arranged a controlling sleeve valve 9 which does not participate in the rotation, and can be axially displaced by means of a lever 11 acting on a pin 10. This lever 11 is secured to a spindle 12 leading out of the casing, to the outer end of which spindle a hand lever 13 is attached. The inside cavity of the hollow sleeve 9 is divided into two chambers by a partition 14, the one of which chambers 15 permanently communicates with the compressed-air supply passages 17, the other 16 with the exhaust 18 through a central bore 18' of the central pinion 29 of the sun and planet gear. From the pressure chamber 15 of sleeve valve 9 the compressed air passes through openings 19, 20 in the sleeve 9 to the passages 21, 22 on the outer controlling surface of the sleeve 9, while the exhaust chamber 16 of the sleeve permanently communicates through an opening 23 with a passage 24 on the outside of the sleeve. To the passages 21, 24, 22 correspond openings 25, 26, 27, 28 in the hollow shaft 1 communicating with the working chambers between the drum 2 and the cam surfaces 4 and 5, which openings may according to the adjustment of the sleeve 9 communicate with the passages in the same or also be completely cut off from a communication with the compressed air supply or the exhaust by being covered by the bearing surfaces between the said passages. The openings 25 and 28 lead directly into the working chambers, and the openings 26 and 27 also communicate therewith by intermediate passages 26' and 27' cut in the outer surface of the hollow shaft 1. The several connections are evident from the diagram of the developed controlling surfaces in Figs. 6ª, 6ᵇ, 6ᶜ, 6ᵈ, 6ᵉ. In these the parts shaded by single lines indicate the bearing surfaces of the sleeve valve 9, the parts shaded by cross lines the openings in the hollow shaft 1 of the piston drum 2, the not shaded parts the passages in the sleeve valve. For facilitating the explanation the controlling surface of the sleeve valve has been divided in Figs. 6ª, 6ᵇ, 6ᶜ, 6ᵈ and 6ᵉ by dotted lines into a number of zones O, I, II, III, IV, V, VI, VII, VIII, IX, X. At the position according to Fig. 6ª the opening 25 will be in zone I, the openings 27 and 26 in zone V, 28 in zone VII. All four openings are covered by the bearing surfaces of the controlling sleeve; the machine is at rest. When sleeve 9 is moved into the position, Fig. 6ᵇ, the openings 25 will be in zone II, the openings 27 and 26 in zone VI, the opening 28 in zone VIII. As the zones II and VIII meet with the passages 21 and 22 which are in communication with the pressure medium supply, and zone VI corresponds with the passages 24 communicating with the exhaust 18', 18, compressed air will pass through opening 28 into the one working chamber. In consequence of its action on the slide 6 the drum 2 will begin to move in the direction of arrow B. The shaft 1 with its openings 25, 26, 27, 28 participates in this movement. The engine now works under full charge, that means to say the openings 25 and 28 communicate almost permanently with the compressed air supply; only at the dead center position of the one end of the piston the respective admission port, say 25 at the position of the piston shown in Fig. 6, will be shut off as else at this position the driving medium would freely flow through the working chamber from pressure into the exhaust pipe, if as shown the elevated level part of the cam surface has not such a circumferential extension that it can simultaneously close both openings say 25, 26'. When the sleeve 9 is moved on in the direction of the arrow A into the position according to Fig. 6ᶜ, the opening 25 will come into zone III and the opening 28 into zone IX, while the openings 27 and 26 remain in the wide zone VI. The engine continues to revolve in the same direction, but now with expansion cut off, as the openings 25 and 28 are covered during the greater part of their circumferential travel and give an admission for a short time only. When the sleeve 9 is moved contrary to the direction of arrow A into the initial position shown in Fig. 6ª, the engine will be stopped. When the sleeve is moved on in the same direction, Fig. 6ᵈ, the openings 25 will reach zone O, the openings 27 and 26 the zone IV, the opening 28 the zone VI, in other words the openings 25 and 28 which communicated at first with the pressure passages 21 and 22, now communicate with the exhaust passage 24, and openings 27 and 26, which communicated with the exhaust passage 24, now communicate with the pressure passage 21, so that the engine will revolve in the reverse sense and at first also under full charge. If the sleeve is still further moved contrary to the direction of arrow A, Fig. 6ᵉ, the openings 27 and 26 will reach zone III, while 25 and 28 remain in zone O and VI, so that the engine revolves to the left with expansion cut off.

The engine according to Figs. 7–9 corresponds with the engine according to Figs. 1–6 with regard to the principle of the power engine. Here, however, no sun and planet gear is represented, whereas also the controlling mechanism is of another design. The latter has here the form of a sleeve valve 32, which may be turned to a certain extent by means of bevel gears 33, 34, the latter of which fits on a spindle 35 provided with a hand lever 36. The sleeve valve 32 is arranged within the hollow shaft 1 in a bush 37. It has three openings 38, 39, 40 for each side of the engine, while the bush has two corresponding groups of openings 41, 42. In the walls of the hollow shaft 1 are formed two similar wide openings 43, which lead into the corresponding working chambers of the engine formed between the cam surfaces 4, 5 and the drum 2. In Figs. 9ª, 9ᵇ and 9ᶜ one set of openings in the sleeve valve 32, bush 37 and hollow shaft 1 is represented, the openings of the other set being arranged accordingly but at angles of 180° relatively to those represented. At the position shown in Fig. 9ª, which is a section through sleeve valve, bush and hollow shaft on an enlarged scale, the engine will be at rest, because the communication from the cavity of the sleeve valve is completely cut off by bush 37, as all openings in the sleeve valve are covered by this bush. When the sleeve valve 32 is moved into the position according to Fig. 9ᵇ the openings 39 and 42 communicate on the one hand and the openings 38 and 41 on the other. When the hollow shaft 1 revolves, its opening 43 will therefore communicate through opening 41 with the cavity of the sleeve valve, from the moment in which the edge 44 begins to clear the opening 41, as shown in the drawing. When the edge 45 of openings 43 has after a certain angle of rotation reached the edge 47 of the opening 41 and therefore again closed this opening, there will nevertheless remain a communication between the cavity of the sleeve valve and the opening 43 through opening 42 until the edge 45 of the hollow shaft has reached the closing edge 48 of the opening 42. The communication thus exists during that angle of rotation which the edge 45 describes from the position shown to the closing edge 48 of opening 42. This does indeed not give a quite full charge but the cut off travel is so long, that the cut off travels of both sides of the engine, alternating by 180°, will overlap, so that always one of the sides of the engine will receive a charge as required to admit of its starting from any position. If the sleeve valve is turned until the opening 42 is closed by the edge 46 of opening 39, as shown in Fig. 9ᶜ, there only remains the communication through 38, 41. The cut off therefore only depends on the duration of the communication between 41 and 43, with other words it corresponds to the angle of rotation which the edge 45 describes from the position shown to the edge 47 of opening 41. The engine will work with expansion.

We claim:

1. A rotary expansion engine, comprising a casing having end walls forming parallel cam surfaces, a rotary member in the casing forming working chambers between its ends and the cam surfaces of the casing, axially movable pistons in the rotary member engaging said surfaces and arranged to work in periods alternating by an angle of 180 degrees, and means to admit fluid to each end of the rotary member during such angle of revolution that the admission periods of the ends overlap each other.

2. A rotary expansion engine comprising a casing having end walls forming parallel cam surfaces, a rotary drum in the casing forming working chambers between its ends and the cam surfaces of the casing, an axially movable slide mounted in a radial slot in the drum and engaging said cam surfaces, and means to admit fluid to each working chamber during such an angle of revolution that the admission periods to both chambers overlap each other.

3. A rotary expansion engine comprising a casing having end walls forming parallel cam surfaces, a rotary drum in the casing forming working chambers between its ends and the ends of the casing, a hollow shaft carrying said drum and having a port therein near each side of the drum, a valve in the hollow shaft having a plurality of ports corresponding to each port of the shaft, a stationary bush interposed between the valve and shaft and provided with a plurality of ports arranged to connect one or more ports of the valve with the ports of the shaft at each side of the drum, for the purpose specified.

4. A rotary expansion engine comprising a casing having end walls forming parallel cam surfaces, a rotary drum in the casing forming working chambers between its ends and the ends of the casing, an axially movable slide mounted in a radial slot in the drum and engaging said cam surfaces, a hollow shaft carrying said drum and having a wide port near each side of the drum, a valve in said shaft and provided with a large and two small ports near each side of the drum, a stationary bush interposed between said valve and shaft and having two ports located near each end of the drum, the relative arrangement of said ports being such that none, or both, or only the large port of the valve is in communication with the interior of the valve and the port in the shaft being of such circumferential length that in a certain position it communicates simultaneously with both ports in the bush, for the purpose specified.

In testimony whereof we affix our signatures in presence of two witnesses.

RUDOLF EISERMANN.
JOSEF LEHNE.

Witnesses:
 AUGUST TRAUTMANN,
 WOLDEMAR HAUPT.